(12) United States Patent
Greiner et al.

(10) Patent No.: US 6,753,027 B1
(45) Date of Patent: Jun. 22, 2004

(54) METHOD OF CONTROLLING A COOKING PROCESS AND A COOKING PROCESS SENSOR FOR USE WITH THE METHOD

(75) Inventors: Michael Greiner, Freising (DE); Peter Kohlstrung, Kaufering (DE); Andreas Jürgens, Kirchheim (DE)

(73) Assignee: Rational Aktiengesellschaft, Landsberg/Lech (DE)

( * ) Notice: Subject to any disclaimer, the term of this patent is extended or adjusted under 35 U.S.C. 154(b) by 0 days.

(21) Appl. No.: 09/664,465

(22) Filed: Sep. 18, 2000

(30) Foreign Application Priority Data

Sep. 20, 1999 (DE) .......................................... 199 45 021

(51) Int. Cl.[7] .................................................. A23L 1/01
(52) U.S. Cl. ..................................... 426/233; 426/523
(58) Field of Search ................................ 426/231, 233, 426/523

(56) References Cited

U.S. PATENT DOCUMENTS 4,933,195 A * 6/1990 Houck ........................ 426/233

FOREIGN PATENT DOCUMENTS

| DE | 31 19 496 | 12/1982 |
| DE | 31 04 926 | 2/1983 |
| DE | 196 09 116 | 9/1997 |
| DE | 40 32 949 | 4/1998 |

* cited by examiner

Primary Examiner—George C. Yeung
(74) Attorney, Agent, or Firm—Schiff Hardin LLP

(57) ABSTRACT

In a method of controlling a cooking process, at least two temperature values are picked up by a cooking process sensor which is adapted to be stuck at least partly into food to be cooked. Specific parameters of cooking food and/or cooking utensils are determined via the thermo kinetics of the temperature values registered, and the specific cooking food and/or cooking utensil parameters determined are utilized for controlling the cooking process. The invention likewise relates to a cooking process sensor for use with the method according to the invention.

19 Claims, 2 Drawing Sheets

METHOD OF CONTROLLING A COOKING PROCESS AND A COOKING PROCESS SENSOR FOR USE WITH THE METHOD

BACKGROUND OF THE INVENTION

The instant invention relates to a method of controlling a cooking process in response to at least two temperature values picked up by a cooking process sensor which is adapted to be stuck at least partly into food to be cooked. The instant invention also relates to a cooking process sensor to be used with a method specified.

A method of the generic kind defined above is known, for instance, from DE 31 19 496 Al. With this known method, a food thermometer is used which comprises a lance-like sensor portion, useful for temperature control, and being equipped with a plurality of temperature sensors and adapted to be stuck into food to be cooked. The known food thermometer is electrically connected to an evaluating unit so that the output of a microwave source is reduced gradually via process control when a certain temperature threshold value, preferably a maximum value per temperature sensor, is reached. It is a disadvantage of the known method that its range of application is very limited in view of the fact that merely threshold temperature values are relied upon for stepwise controlling of the cooking process.

SUMMARY OF THE INVENTION

It is an object of the instant invention to improve the method defined initially such that the disadvantages of the prior art are overcome.

The object is met, in accordance with the invention, in that specific parameters of cooking food and/or cooking utensils are determined via the thermokinetics of the temperature values registered, and the specific cooking food and/or cooking utensil parameters determined are utilized for controlling the cooking process.

In accordance with the invention provision may be made for having the cooking process sensor detect a plurality of temperature values, preferably four, at various depths of penetration inside the cooking food and at least one more temperature value outside of the cooking food, preferably at the surface of the cooking food, and for using these values to control the cooking process.

Furthermore, it is suggested according to the invention to register at least one moisture value in and/or at the cooking food by means of the cooking process sensor and draw upon it for controlling the cooking process.

It is likewise proposed according to the invention that the flow of air at least at the cooking food be registered by the cooking process sensor and relied upon for controlling the cooking process.

According to the invention, moreover, it is proposed that differential temperature values and/or differential moisture values between sensors arranged spaced apart along the direction of penetration of the cooking process sensor be detected and drawn upon for controlling the cooking process.

A further development of the invention is characterized in that the core temperature of the cooking food, the placement of the cooking process sensor in the cooking food, especially with respect to the core point of the cooking food, the diameter of the cooking food, the density of the cooking food, the type of cooking food, the degree of ripeness of the cooking food, the pH of the cooking food, the consistency of the cooking food, the storage condition of the cooking food, the smell of the cooking food, the taste of the cooking food, the quality of the cooking food, the browning of the cooking food, the crust forming of the cooking food, the vitamin decomposition of the cooking food, the formation of carcinogenic substances in the cooking food, the hygiene of the cooking food, and/or the heat conductivity of the cooking food is/are determined as a specific cooking food parameter or parameters, preferably by extrapolation or iteration of the values registered by the cooking process sensor.

According to the invention it is also proposed to determine as cooking utensil parameter or parameters the power, the amount of air circulated, the energy consumption, the charge, the specific performance and/or the load:power ratio of a cooking utensil, preferably by extrapolation or iteration of the values registered by the cooking process sensor.

An embodiment of the invention is characterized in that the temperature values, the differential temperature values, the moisture values, the differential moisture values and/or the air flow values registered are supplied by the cooking process sensor to a control unit for a heater element, a cooling element, a ventilator, a unit for introducing moisture into the cooking space, a unit for discharging moisture from the cooking space, a unit for supplying energy, and/or a unit for dissipating energy, especially for controlling the course of the cooking process and/or achieving a set cooking result.

It is further proposed in accordance with the invention that the temperature values, the differential temperature values, the moisture values, the differential moisture values, and/or the air flow values registered by the cooking process sensor be utilized for controlling the temperature path, the moisture content, the air flow, the defined parameters of the cooking food and/or cooking utensils.

It may also be provided according to the invention that the water activity, the moisture content, and/or the protein content of the cooking food is/are determined by the cooking process sensor or supplied to an evaluating unit for the parameters obtained by the cooking process sensor.

Moreover, the invention provides a cooking process sensor for use with a method according to the invention, comprising a tip equipped with at least two sensors and to be introduced at least partly into cooking food, preferably by means of a handle.

It may be provided for the tip to comprise at least four temperature sensors and at least one temperature sensor to be provided at the handle.

A preferred further development of the invention is characterized by comprising at least one other sensor unit adapted to be fixed or fixed in the cooking space.

Moreover, an evaluating and/or control unit, preferably in the form of a microprocessor may be provided in the cooking process sensor.

Finally, it is suggested that the cooking process sensor comprise a cable or a transmitter and receiver unit, including power supply.

In cooking, the method of the instant invention permits accurate determination particularly of the core temperature of food to be cooked, based on the kinematics, i.e. the course in time, of temperature values registered inside the cooking food by means of a cooking process sensor. This is possible even if cooking process sensors should not be positioned very accurately. Therefore, not only are better results obtainable but also results which are better reproducible since the cooking programs are controlled by core temperatures. Furthermore, the duration of core temperature controlled cooking programs can be predetermined more precisely. The exact determination of a core temperature also makes it possible to provide a meaningful hygiene indication.

Other climatic parameters, such a moisture values, differential moisture values, and/or air flow values likewise can be picked up according to the invention so that it can be prevented that the surface of the cooking food dries out. On the contrary, the cooking food will result uniformly done, having the desired browning, color, consistency, and hygiene at the end of the cooking process. This means that standardized cooking quality can be warranted.

In particular, cost and energy can be saved in the course of a cooking process according to the invention by virtue of the values recorded by means of the cooking process sensor as the air flow required, the specific performance, and the like can be minimized.

Further features and advantages of the invention will become apparent from the following description of an embodiment according to the invention illustrated by way of example in the accompanying single diagrammatic figure which is a perspective view of an intelligent cooking process sensor according to the invention, shown introduced into food to be cooked.

DESCRIPTION OF THE PREFERRED EMBODIMENTS

Figure 1:
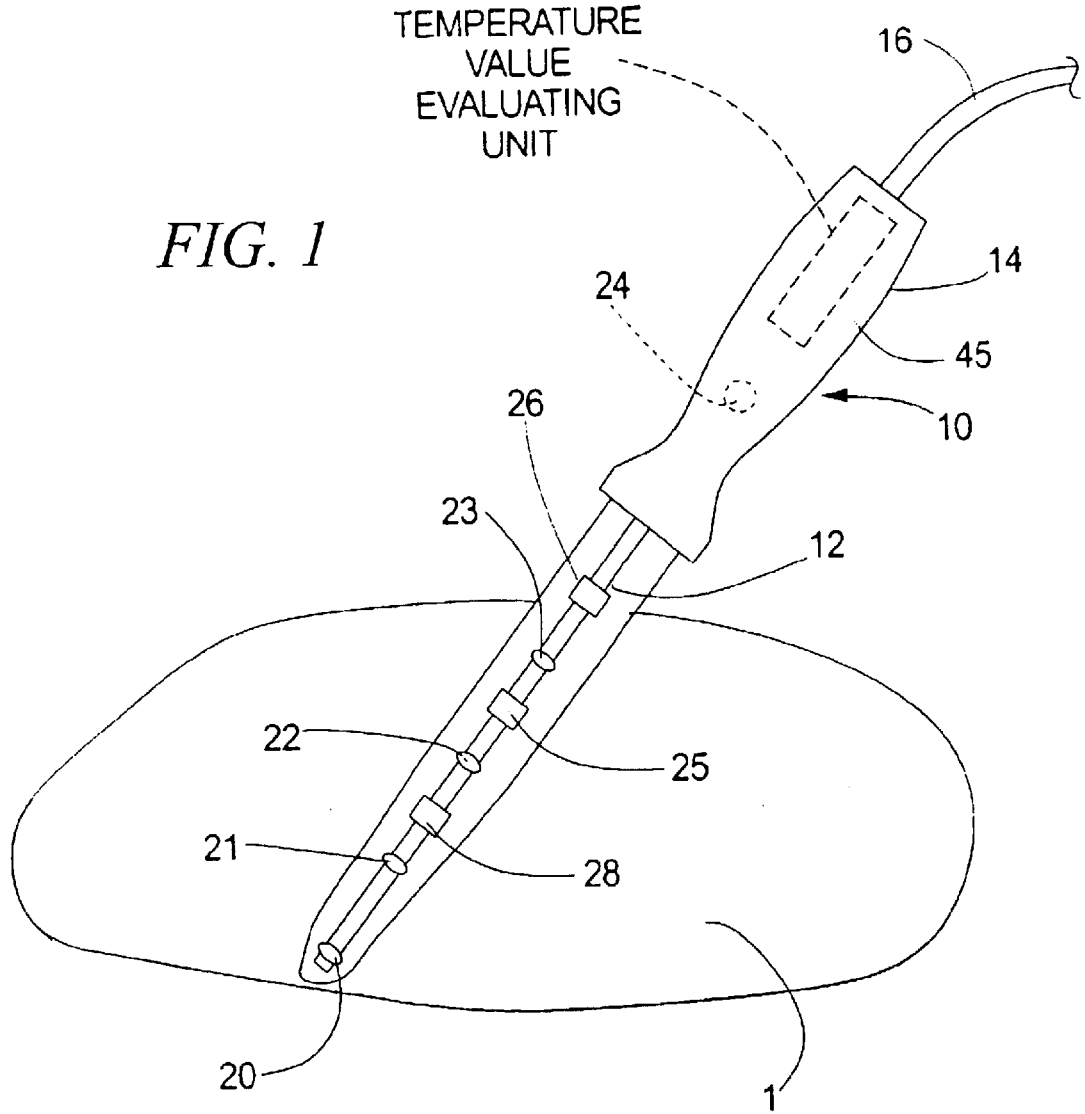
FIG. 1 is a perspective illustration of the inventive cooking food sensor according to the invention.

As may be seen FIG. 1, an intelligent cooking process sensor according to the invention in the form of a temperature sensor 10, for instance, comprises a tip 12, a handle 14, and a cable 16, the tip 12 being adapted to be inserted in cooking food 1. Moreover, there are four temperature sensors 20, 21, 22, 23 disposed in the area of the tip 12 and serving to detect the temperature in the cooking food, while there is another temperature sensor 24 inside the handle 14 to detect the temperature at the cooking food 1.

An evaluating unit 45 for the (differential) temperature values to be registered is integrated in the temperature sensor 10 according to the invention. This evaluating unit 45 in turn is connected to a microprocessor evaluation and control unit 29 or apparatus 29 for a cooking utensil 9.

The temperature sensor 10 according to the invention is useful for providing more than one value of temperature within the cooking food 1 and another value of temperature prevailing at the cooking food 1. Consequently the thermo-kinetics of the (differential) temperature values obtained by means of the temperature sensors 20 to 24 may be relied upon for determining especially the actual core temperature of the cooking food 1, such as by extrapolation. The exact core temperature thus determined may then be utilized for controlling the cooking process.

In addition to the core temperature, the heat transfer into or to the cooking food 1 from a heater element 32 arranged in the cooking space also may be detected and used, for example, to control a fan ventilator 36. The course over time of the core temperature, determined on the basis of the (differential) temperature values detected, may be drawn upon in order to find out the load:power ratio during cooking, among others for determining the cross section of the cooking food.

Moisture sensors 25, 26, and 28 may also be provided in the sensor 10 at various locations including both in the food 1 or at the surface of the food 1.

To measure airflow at least at the cooking food the cooking process sensor may have an airflow sensor 46 creating an airflow value used for controlling the cooking process.

Figure 2:
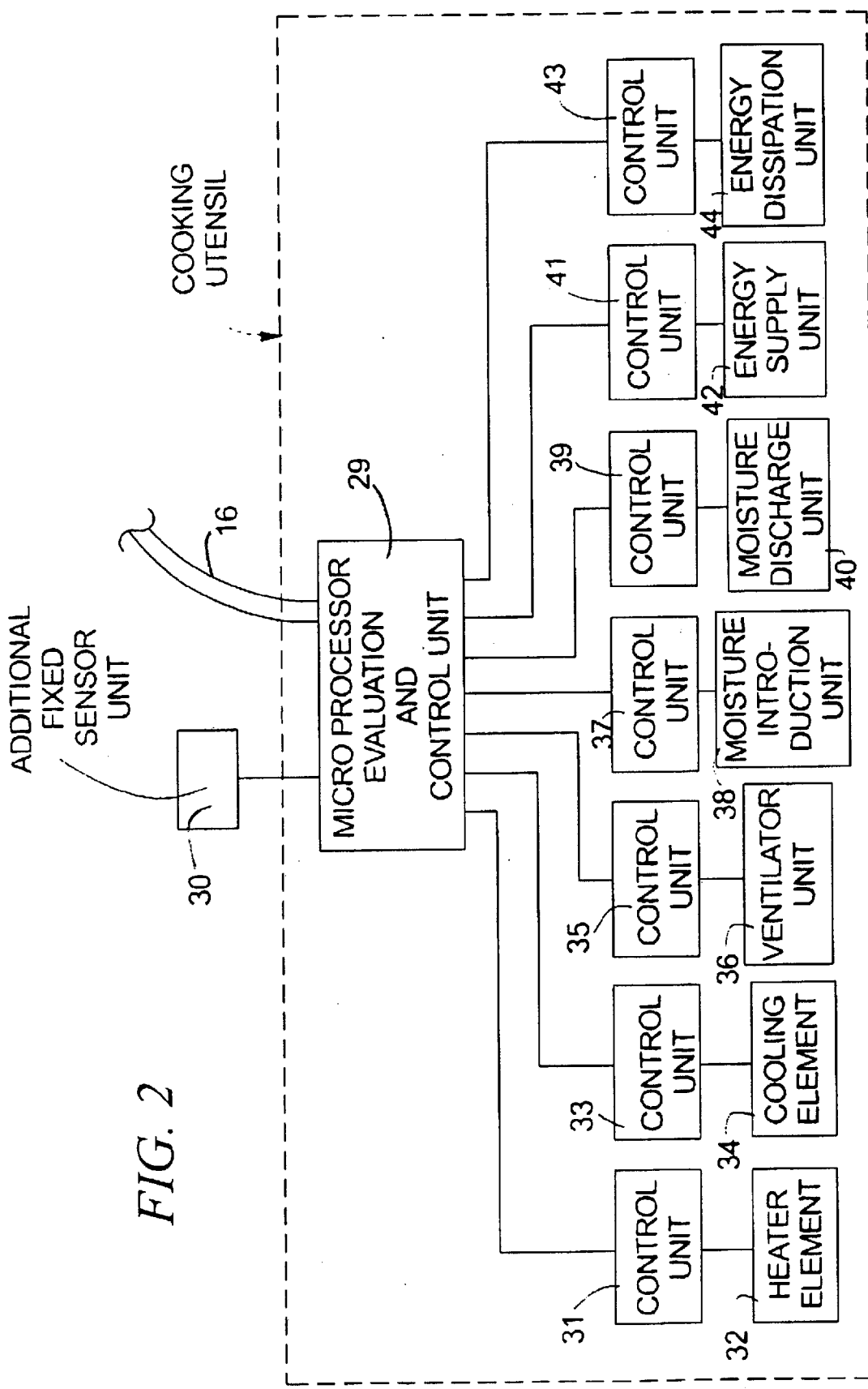
FIG. 2 is a block diagram of the cooking utensil with a microprocessor evaluation and control unit connected to receive signals from the inventive cooking sensor.

Referring now more specifically to FIG. 2, the cable 16 connected to the cooking sensor 10 shown in FIG. 1 connects to the cooking utensil 9 having an internal microprocessor evaluation and control unit 29. An additional fixed sensor unit 30 may also be provided in the cooking space in addition to the sensor 10. This additional sensor unit is also connected to the microprocessor unit 29.

The cooking utensil microprocessor unit controls via respective control units 31, 33, 35, 37, 39, 41 and 43 a respective heater element 32, cooling element 34, ventilator unit or (fan) 36, moisture introduction unit 38, moisture discharge unit 40, energy supply unit 42, and energy distribution unit 44.

The features of the invention disclosed in the above specification, in the drawings and claims may be essential both individually and in any desired combination for implementing the invention in its various embodiments.

Although various minor modifications might be suggested by those skilled in the art, it should be understood that our wish to embody within the scope of the patent warranted hereon all such modifications as reasonably and properly come with the scope of our contribution to the art.

We claim as our invention:

1. A method for controlling a cooking process, comprising the steps of:
   detecting several temperature values in different penetration depths within a food being cooked via a cooking process sensor, and detecting at least one temperature value outside said food;
   determining at least core temperature of said food via a thermo-kinetics comprising a time dependency of said temperature values detected within said food; and
   utilizing the determined core temperature and the temperature value detected outside said food for controlling the cooking process.

2. The method of claim 1 wherein at least three temperature values are detected by the cooking process sensor within the food being cooked at different depths of penetration.

3. The method according to claim 2 wherein at least four temperature values are detected.

4. The method according to claim 1 wherein said cooking process sensor has at least three temperature sensors thereon, one of the temperature sensors being provided for measuring said temperature value outside said food.

5. The method of claim 1 wherein at least one moisture value is registered by the cooking process sensor and is drawn upon for controlling the cooking process.

6. The method according to claim 5 wherein the process sensor measures said at least one moisture value within the food being cooked.

7. The method according to claim 1 wherein airflow at least at the food being cooked is registered by an airflow sensor of the cooking process sensor and is utilized for controlling the cooking process.

8. The method of claim 1 wherein differential temperature values between sensors arranged spaced apart along a direction of penetration of the cooking process sensor are detected and used for controlling the cooking process.

9. The method according to claim 1 wherein at least two moisture value sensors are provided in the cooking process sensor and differential moisture values are obtained and utilized for controlling the cooking process.

10. The method of claim 1 wherein said core temperature of the food being cooked is determined by extrapolation of values registered by the cooking process sensor.

11. The method according to claim 1 wherein said core temperature of the food being cooked is determined by iteration of values registered by the cooking process sensor.

12. The method according to claim 1 wherein said process sensor also comprises at least one of an air flow sensor and a moisture sensor, and at least one parameter of a cooking utensil which is cooking the food is controlled which is at least one of heating, cooling, ventilating, moisture introduction, moisture discharge, energy supply, and energy dissipation.

13. The method of claim 1 wherein at least one parameter of a cooking utensil which is cooking the food is controlled by extrapolation of values registered by the cooking process sensor.

14. The method according to claim 1 wherein at least one parameter of a cooking utensil which is cooking food is controlled by iteration of values registered by the cooking process sensor.

15. The method of claim 1 wherein the process sensor also comprises at least one of an air flow sensor and a humidity sensor, and wherein at least one of temperature values, differential temperature values, moisture values, and differential moisture values picked up by the process sensor are supplied by the cooking process sensor to a control unit for at least one of a heater element, a cooling element, a ventilator, a unit for introducing moisture into a cooking space of the food being cooled, a unit for discharging moisture from the cooking space, a unit for supplying energy, and a unit for dissipating energy.

16. The method of claim 1 wherein the process sensor comprises at least one of an air flow sensor and a moisture sensor, and wherein at least one of temperature values, differential temperature values, moisture values, airflow values and differential moisture values picked up by the cooking process sensor are utilized for controlling at least one of temperature path, moisture content, and air flow.

17. The method of claim 1 wherein the cooking process sensor comprises at least one of an air flow sensor and a moisture sensor, and wherein at least one of water activity and moisture content of the food being cooked is determined by the cooking process sensor.

18. The method according to claim 1 wherein values picked up by the cooking process sensor are supplied to an evaluating unit.

19. A method for controlling a cooking process, comprising the steps of:

detecting a moisture value and several temperature values in different penetration depths within a food being cooked via a cooking process sensor, and detecting at least one temperature value outside said food;

determining at least core temperature of said food via a thermo-kinetics comprising a time dependency of said temperature values detected within said food; and utilizing the determined moisture value, core temperature, and the temperature value detected outside said food for controlling the cooking process.

* * * * *